(No Model.)
W. E. SELLECK.
RECORDING WEIGHING SCALE.
No. 393,398. Patented Nov. 27, 1888.
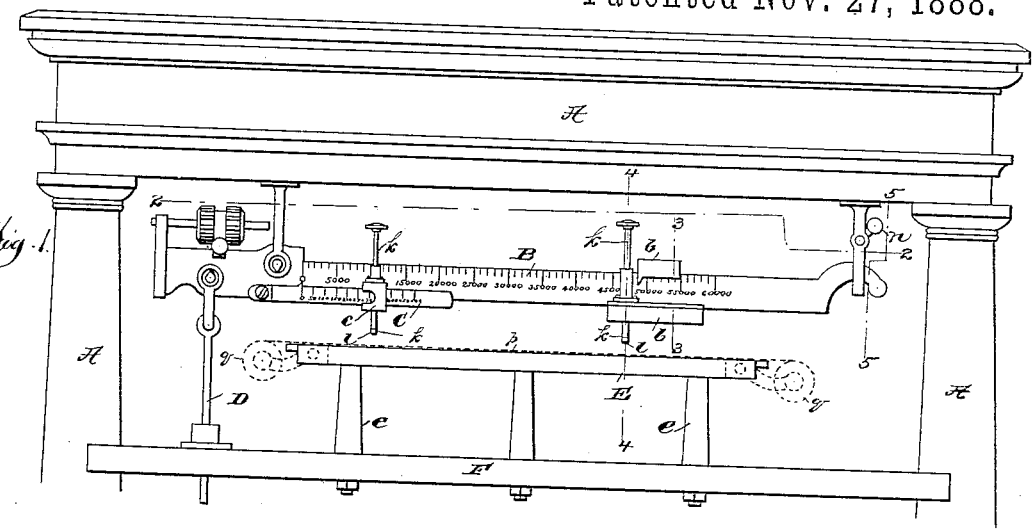
Fig. 1.
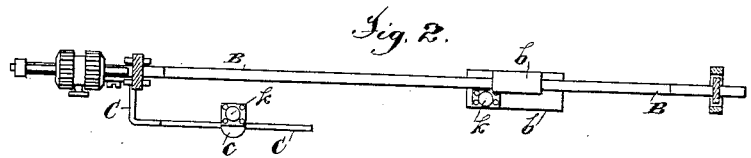
Fig. 2.
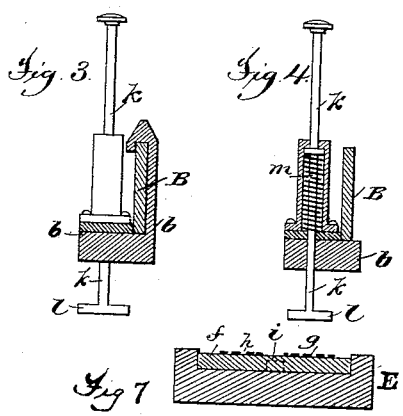
Fig. 3. Fig. 4.
Fig. 7.
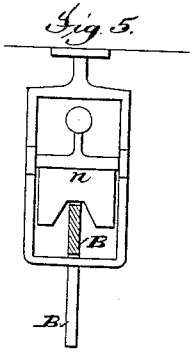
Fig. 5.
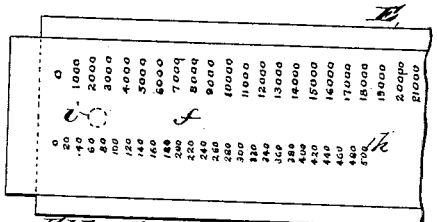
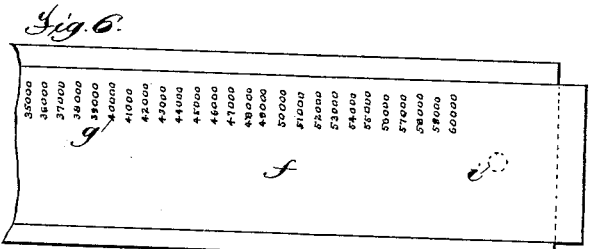
Fig. 6.
Attest:
Geo. H. Betts.
G. M. Borsh.
Inventor:
William E. Selleck,
by Philipp, Phelps & Hovey.
Attys.
N. PETERS, Photo-Lithographer, Washington, D. C.

UNITED STATES PATENT OFFICE.

WILLIAM E. SELLECK, OF CHICAGO, ILLINOIS.

RECORDING WEIGHING-SCALE.

SPECIFICATION forming part of Letters Patent No. 393,398, dated November 27, 1888.

Application filed June 27, 1887. Serial No. 242,579. (No model.)

*To all whom it may concern:*

Be it known that I, WILLIAM E. SELLECK, a citizen of the United States, residing at Chicago, county of Cook, and State of Illinois, have invented certain new and useful Improvements in Weighing-Scales, fully described and represented in the following specification and the accompanying drawings, forming a part of the same.

The improvements constituting the present invention are applicable to all classes of scales in which a graduated beam having a shifting poise is employed; but they are more especially designed for use in connection with scales of the larger sizes which are used for weighing grain or other produce or merchandise in bulk or in large quantities or wagons or cars and their contents. In this class of weighing it is of course necessary to make a record of each reading of the scale for the purpose of computing the value of the merchandise or the freight, and it has been found in practice that where the record is made by the attendant in the ordinary way by writing it in a book mistakes are liable to occur, which, when made, occasion much trouble and sometimes serious loss. To overcome this difficulty it is desirable that means should be provided by which the reading of the scale can be recorded mechanically, and thus avoid that liability to error and mistake incident to all mental operations. The present invention is designed to accomplish this result, both in connection with those scales in which the full weighing capacity is indicated by a shifting poise or poises and those in which removable counterpoise-weights are employed in addition to a shifting poise or poises.

As a full understanding of the invention can be best given by an illustration and description of the manner in which it is applied and operates, all further preliminary description will be omitted and a full description given, reference being had to the accompanying drawings, in which—

Figure 1 is a front elevation of the upper portion of an ordinary large-sized platform-scale, showing the improvements constituting the present invention applied thereto, the scale in the case shown being of the class in which a plurality of beams are employed, upon which the whole capacity of the scale is indicated. Fig. 2 is a top view of the beams and their poises. Figs. 3, 4, and 5 are enlarged cross-sections taken, respectively, upon the lines 3 3, 4 4, and 5 5 of Fig. 1; and Fig. 6 is an enlarged plan view of the plate from which the record is printed and its support. Fig. 7 is a cross section of the same.

Referring to said figures it is to be understood that A represents the usual frame-work for supporting the beam; B, the main beam; C, the auxiliary beam, and D the rod connecting the main beam to the levers beneath the scale-platform of an ordinary large sized platform or railway-car scale. The beams B C are graduated to indicate the full capacity of the scale, no counterpoise-weights being used. The auxiliary beam C is provided with a sliding poise, c, and is graduated to indicate the weight from 0 to, say, 1,000 pounds. The beam B is provided with a poise, b, and is graduated to indicate the weight from 0 to the full capacity of the scale—say 60,000 pounds.

Located beneath the beams C D and slightly below the lower ends of the poises b c is a table or platform, E, which is supported in any suitable manner, as by standards e, rising from a cross-piece, F, extending between the main standards of the frame-work A. The table E is recessed upon its top to provide a seat for a plate, f, which is provided upon its upper face with rows, g h, of raised figures, corresponding to the graduations upon the beams B C. The rows of figures g h may be formed either by electrotyping or stereotyping, or in any other suitable manner. In some cases they may be set up in ordinary movable type and locked in a suitable form or chase. The plate f is prevented from moving lengthwise by a stud or studs, i, which enter recesses formed in the bottom of the plate. Each of the poises b c is provided with a vertical opening through which passes a small rod or plunger, k, the lower end of which is provided with a head, l, which, as the plunger is depressed, comes down onto the number in the row g or h, as the case may be, corresponding to the number on the beam to which the poise carrying the plunger is adjusted. Each of the plungers k is provided with a spring, m, arranged in any suitable manner to hold the plunger in its raised position, except when pressure is applied from above.

The manner of using the apparatus thus organized is as follows: The poises $b\ c$ having been adjusted along the beams B C until they indicate the weight of the article being weighed, the reading of the scale may be taken and recorded in the usual manner; but before the poises are moved the attendant will insert a card or piece of paper between first one and then the other of the heads $l$ and the figures in the rows $g\ h$, at the same time striking down the respective plungers $k$, so as to cause the heads $l$ to force the card or paper against the raised figures of the numbers beneath the heads. By this means the figures will be embossed or indented in the card or paper, thus making a record of the reading of the scale, and this record, being made mechanically, will not be liable to error.

In order to cause the heads $l$ to strike squarely upon the figures upon the plate $f$, it is important that the scale-beams should be prevented from moving up or down or laterally while the record is being made. To attain this result, the end of the beam B is arranged to be acted on by a latch, $n$, arranged in substantially the usual manner to lock the beam to prevent it from vibrating on its fulcrum-pivots, and this latch is provided upon its locking-edge with a V-shaped notch or recess, which acts, as shown in Fig. 5, to center the beam and hold it against any tendency to lateral movement when the latch is down. It will therefore be advisable to turn the latch $n$ so as to lock the beam before operating the plungers $k$ to make the record, as before explained.

If in any case it should be preferred to print the numbers upon the card with ink, it can readily be done by arranging an inked ribbon, $p$—such as is used in hand-stamps and typewriters—above the plate $f$, as shown by dotted lines in Fig. 1. This ribbon can be arranged upon spools $q$ at the ends of the table E, as also shown by dotted lines.

The plate $f$, bearing the rows of numbers $g\ h$, is made removable, so that it can readily be changed for one bearing figures or characters, by which the weight will be indicated in bushels or in any other unit; and it is also to be remarked that the figures upon the plate may, if desired, be made to record the weight both in pounds and bushels or other unit—thus, 3,600: 60, for wheat, or 3,840: 120, for oats.

Although the scale herein illustrated is one having two beams and poises, it will of course be seen that the invention is equally applicable to a scale in which only one beam is employed. By employing removable weights or counterpoises provided with markers such as described in my application for Letters Patent filed February 15, 1887, Serial No. 227,669, now Patent No. 378,557, the present invention can also be applied to those scales in which removable weights or counterpoises are employed.

What I claim is—

1. In a weighing scale, the combination, with the beam, of a row of stationary raised figures or characters bearing a certain relation to the graduation on the beam and arranged adjacent thereto, and a shifting poise mounted upon the beam and provided with a plunger arranged to strike a card or paper against the figures corresponding to the position of the poise, substantially as described.

2. In a weighing-scale, the combination, with the beam, of a row of stationary raised figures or characters bearing a certain relation to the graduation on the beam and arranged adjacent thereto, and a shifting poise mounted upon the beam and provided with a plunger arranged to strike a card or paper against the figures corresponding to the position of the poise, and the latch $n$, arranged to center and lock the beam, substantially as described.

In testimony whereof I have hereunto set my hand in the presence of two subscribing witnesses.

WILLIAM E. SELLECK.

Witnesses:
 HAMILTON BORDEN,
 J. M. SELLECK.